United States Patent [19]

Tsai

[11] Patent Number: 4,937,920
[45] Date of Patent: Jul. 3, 1990

[54] ATTACHMENT DEVICE

[76] Inventor: Allan Tsai, 2nd Fl., No. 1, Lane 222, Tun-Hua N. Rd., Taipei, Taiwan

[21] Appl. No.: 368,813

[22] Filed: Jun. 20, 1989

[51] Int. Cl.$^5$ .............................................. A44B 21/00
[52] U.S. Cl. ........................................ 24/3 C; 24/3 R; 24/442; 2/DIG. 6
[58] Field of Search ................ 24/3 C, 3 R, 3 G, 3 F, 24/3 H, 442, 306; 128/DIG. 15; 2/DIG. 6; 248/205.2, 205.3

[56] References Cited

U.S. PATENT DOCUMENTS

| | | | |
|---|---|---|---|
| 1,638,073 | 8/1927 | van Heusen | 24/3 R |
| 2,858,733 | 11/1958 | Lodewick et al. | 24/3 C |
| 3,057,354 | 10/1962 | Roberts et al. | 128/DIG. 15 |
| 3,063,749 | 11/1962 | Struble et al. | 2/DIG. 6 |
| 3,587,570 | 6/1971 | Kilbey | 128/DIG. 15 |
| 3,866,611 | 2/1975 | Baumrucker | 128/DIG. 15 |
| 3,879,804 | 4/1975 | Lawrence | 24/3 C |
| 3,940,873 | 3/1976 | Lawless | 24/442 |
| 4,114,838 | 9/1978 | Knauf | 24/16 R |
| 4,632,389 | 12/1986 | Moss | 128/DIG. 15 |
| 4,642,815 | 2/1987 | Allen | 2/DIG. 6 |

FOREIGN PATENT DOCUMENTS 933760   4/1948   France .................................. 24/9

Primary Examiner—Victor N. Sakran
Attorney, Agent, or Firm—Oblon, Spivak, McClelland, Maier & Neustadt

[57] ABSTRACT

A folding plate member has at least one folding line therein which divides the plate member into at least two portions, the portions lying over one another when the plate member is folded. Releasable hook-and-loop fastening members, known by the commercial name "Velcro", are provided on the divided portions to adhere the portions face-to-face. Two belt members each has a first end placed between the divided portions and a second free end opposite to the first end. The first ends of the belts are provided with hook-and-loop fastening members to engage with the hook-and-loop fastening members of the folding plate member. A second fastener is connected to the end of each belt member for the purpose of connecting the belt member to an implement.

7 Claims, 6 Drawing Sheets

ATTACHMENT DEVICE

FIELD OF THE INVENTION

This invention relates to an attachment device used for the attachment of an implement to the body of a person and particularly to an attachment device having a holding plate member with belts attached thereto and VELCRO-type fasteners incorporated therein.

OBJECTS OF THE INVENTION

An object of the invention is to provide a multi-purpose simple attachment device for attaching implements to the head, neck, wrists, or the clothing pockets of a person.

Another object of the invention is to provide a multi-purpose simple attachment device which can be used to hang eye-glasses on the neck of a person as well as to be used as a bag or the like to hold eye-glass accessories, such as a glass cleaning paper or cloth, a demisting agent bottle, etc.

Still another object of the invention is to provide a multi-purpose watch belt which can be attached to a person's wrist as well as to the person's head for the purpose of avoiding damages caused to a watch attached thereto when the person plays ball.

SUMMARY OF THE INVENTION

According to the present invention, an attachment device includes a folding plate member having at least one folding line therein which divides the plate member into at least two portions, the portions lying over one another when the plate member is folded. A first fastener means is attached to the portions for adhering face-to-face the portions to one another, and the fastener means has a releasable hook-and-loop fastening member. Two belt members each has a first end placed between the divided portions and a second free end opposite and the first end, the first end has a hook-and-loop fastening member to engage with the hook-and-loop fastening member of the folding plate member. A second fastener means is connected to the second end of each of the belt members.

The second fastener means may include a looped tie cord adapted to be connected to the frame of a pair of eye-glasses. Alternatively, the second fastener means of the belt members are of the type connectible to one another.

In one aspect of the invention, the folding plate member has two parallel folding lines and three portions divided by the folding lines, the first fastening means being provided on two adjacent ones of the portions at the same side thereof and on the remaining one of the portions at the opposite side. The first ends of the belt members are attached to an intermediate one of the portions.

The attachment device may further comprise a pocket member attached to one of the divided portions. Certainly, a watch member can be attached to one of the divided portions. Moreover, the device may further include a flat casing and a connecting member to connect the flat casing to the plate member. The connecting member is in the form of a U-shaped clamp so that the attachment device can be attached to a pocket on the clothing of of a person.

The present exemplary preferred embodiment of the invention will be described in detail with reference to the accompanying drawings, in which:

DETAILED DESCRIPTION OF THE PREFERRED EMBODIMENTS

The First Embodiment

Figure 1:
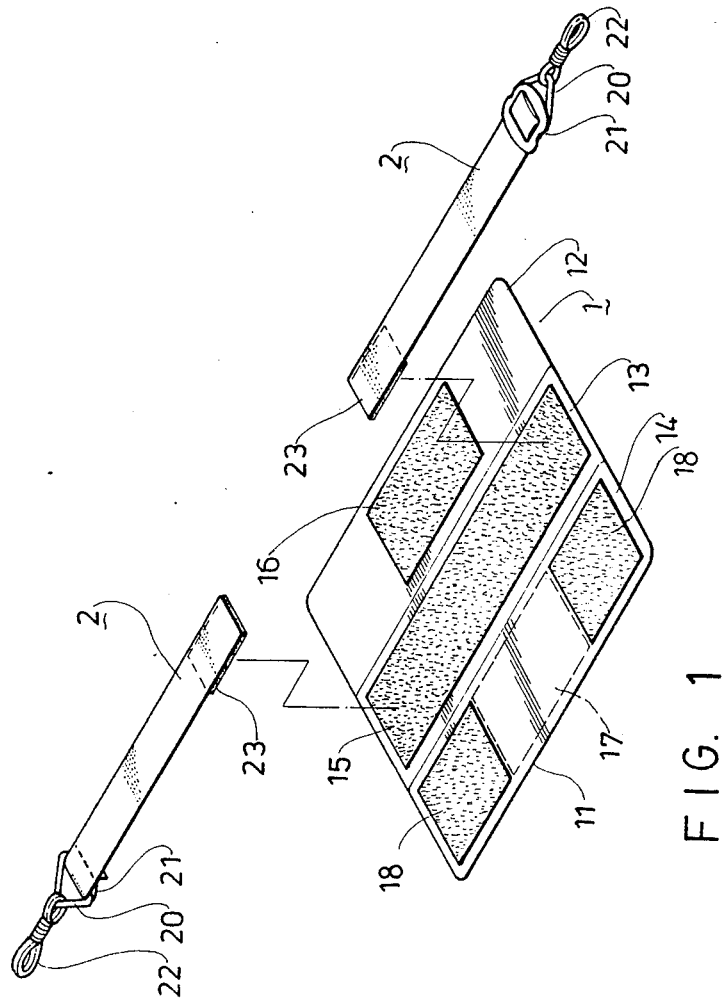
FIG. 1 is a exploded view of a first embodiment of the present invention.

Referring to FIG. 1, a first embodiment of an attachment device of the invention is shown, including a folding plate 1 and two belt pieces 2. The folding plate 1 is made of a flexible material such as leather, plastic, etc., and is provided with two folding lines 11 which divide the plate 1 into three rectangular portions 12, 13, 14. The plate 1 can be folded along the folding lines 11 so that the rectangular portions 12, 13, 14 are laid over one another. On the upper surfaces of the rectangular portions 12, 13 are adhered two strips 15, 16 of hook-and-loop fastening material which is well known under the tradename of Velcro. On the upper surface of the portion 14 are provided two VELCRO-type fastening strips 18, and on the lower surface thereof is adhered another VELCRO-type fastening strip 17.

The two elongated belts 2 are made of a flexible material, preferably an elastic rubber material, and they are attachable to the folding plate. One end of each belt 2 is provided with a VELCRO-type fastening strip 23 to engage with the fastening strip 15. The other end of each belt 2 is connected to a looped tie-cord 22 through a buckle 20.

Figure 2:
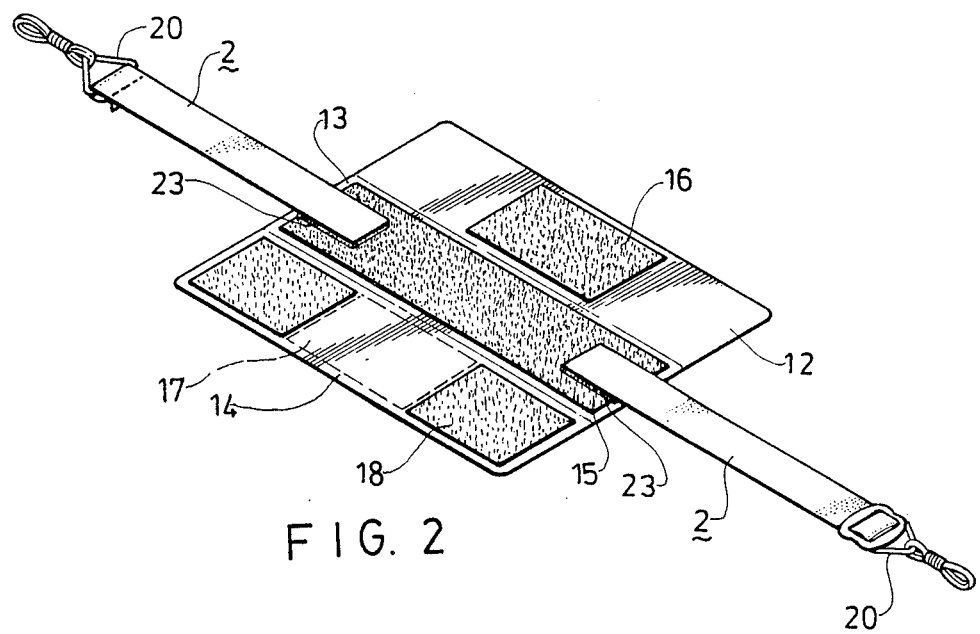
FIG. 2 is a perspective view of the first embodiment in an unfolded position.
Figure 3:
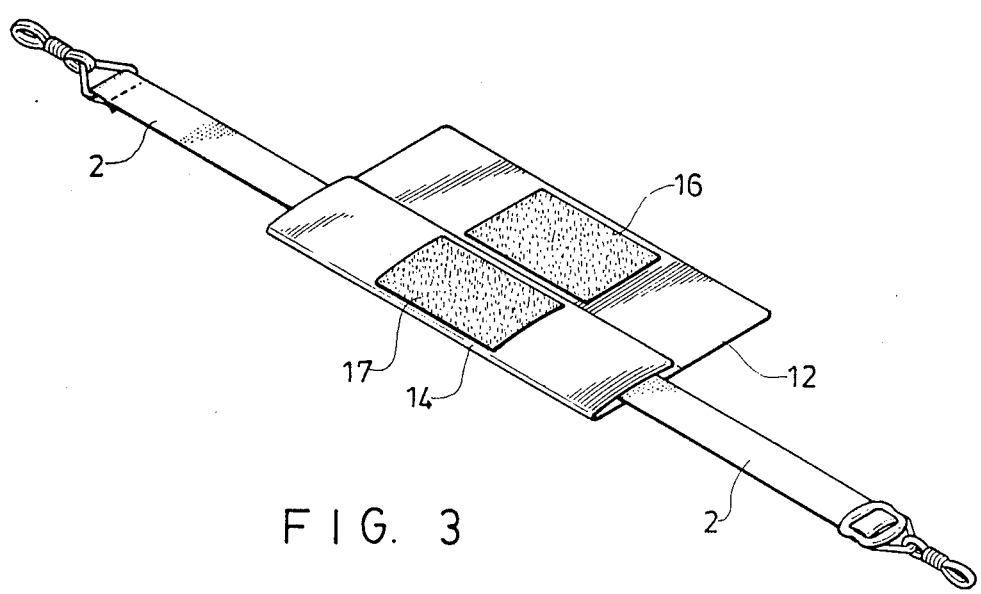
FIG. 3 is a perspective view of the first embodiment in a partially folded position.
Figure 4:
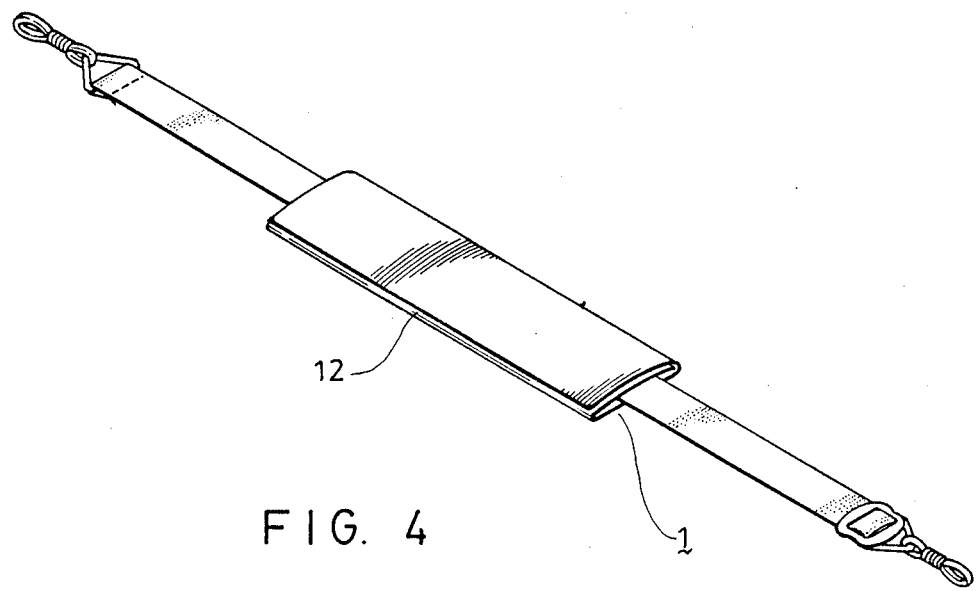
FIG. 4 is a perspective view of the first embodiment in a completely folded position.

Referring to FIGS. 2, 3 and 4, the rectangular portion 14 is first folded over the intermediate rectangular portion 13, and then the rectangular portion 12 is laid over the rectangular portion 14, thereby forming an elongated belt member. The fastening strip 16 of the rectangular portion 12 is engaged with the fastening strip 17 of the rectangular portion 14, and the fastening strips 18 are engaged with the fastening strip 15, thereby clamping the ends of the belts 2 firmly between the rectangular portions 12 and 13. The lengths of the belts 2 extending outward from the plate 1 can be varied by changing the position of the first ends of the belts on the rectangular portions 12, 13.

Figure 5:
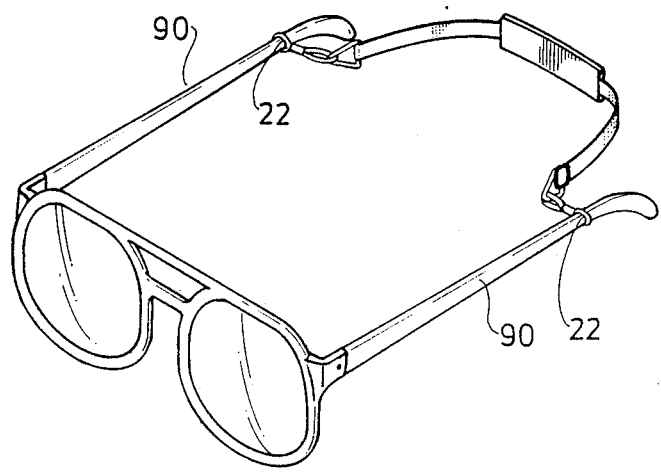
FIGS. 5 and 5a show how the attachment device of the first embodiment is used.
Figure 6:
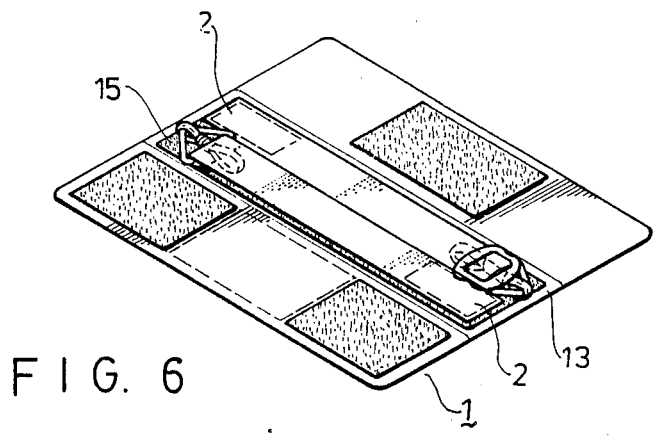
FIGS. 6 shows how the attachment device is compacted when not in use.
Figure 5A:
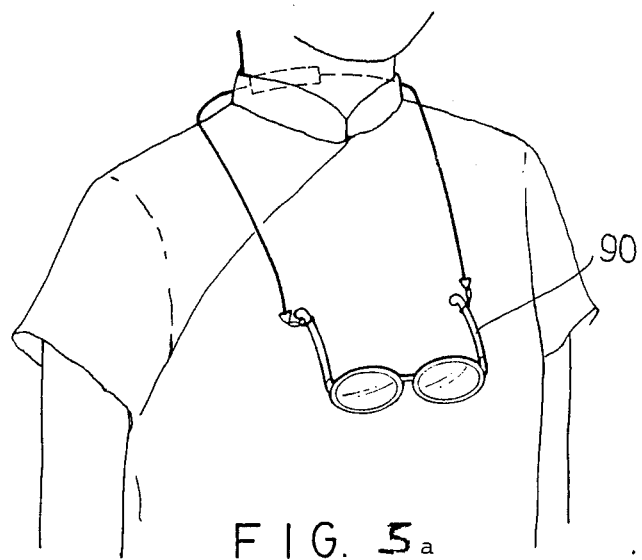

Referring to FIGS. 5, and 5a, the attachment device of this embodiment can be connected to a frame 90 of a pair of eye glasses for the purpose of attaching the eye glasses to the neck of a person. When the attachment device is not used, it can be kept compacted for convenient carrying by first lying the belts 2 on the fastening strip 15 and then clamping the belts 2 in the folded plate member 1 as shown in FIGS. 6.

The Second Embodiment

Figure 7:
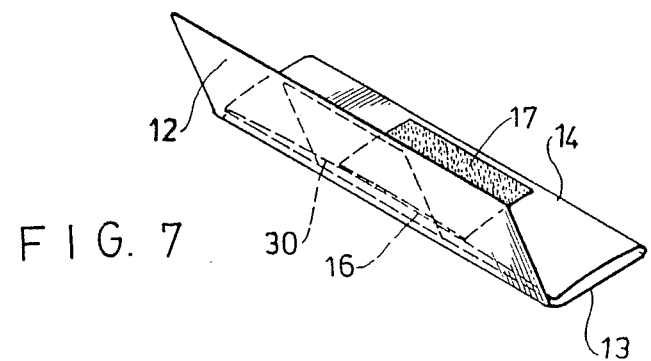
FIG. 7 shows a second embodiment of the attachment device.

A second embodiment of the attachment device is shown in FIG. 7, in which the elements similar to those of the first embodiment are represented by similar numerals. In the second embodiment a pocket 30 is provided on one side of the rectangular portion 14 of the foldable plate member 1 for the purpose of accommodating eye glass cleaning paper or the like. The pocket 30 may be formed by sewing or adhering three sides of a foursided flexible sheet to three marginal portions of the rectangular portion 14 of the plate member 1. The rectangular portion 12 is laid over the pocket 30 to serve as a cover. Although the pocket 30 is formed on the rectangular portion 14 in FIG. 7, the invention is not limited thereto. The pocket 30 may also be formed on the rectangular portions 12, 13 of the plate member 1.

The Third Embodiment

Figure 8:
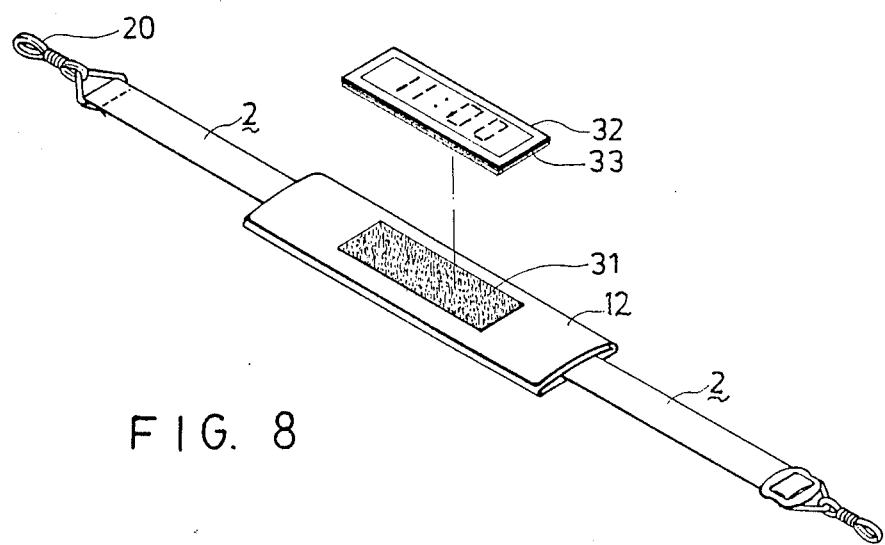
FIG. 8 shows a third embodiment of the attachment device.

A third embodiment of the invention is shown in FIG. 8, in which the elements similar to those of the previous embodiments are represented by similar numerals. In the third embodiment, a Velcro-type strip 31 is secured to the outer side of the rectangular portion 12. An electronic watch 32 in the form of a plate is provided on the bottom with a Velcro-type portion 12 strip 33 and is attached to the pocket 30 by the engagement of the bottom Velcro-type strip 33 with the Velcro-type strip 31. The attachment device of this embodiment can be used as a watch belt or to hang eye glasses. A person who is playing ball may safely keep his watch on his head by connecting the looped tie cords 22 to two arms of the frame of his eye glasses and placing the watch 32 at the back of his head.

The Fourth Embodiment

Figure 9:
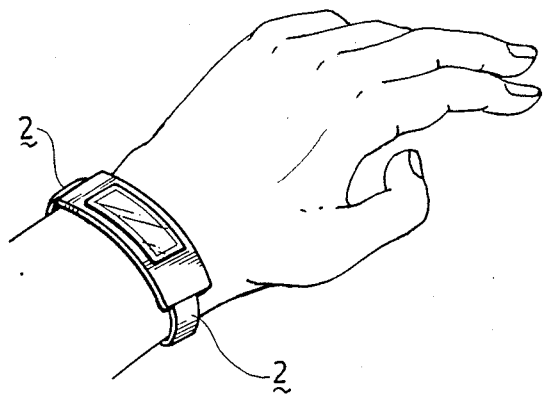
FIG. 9 shows a fourth embodiment of the attachment device.

FIG. 9 shows a fourth embodiment of the attachment device which differs from the third embodiment in that the looped tie cords 22 are replaced by Velcro-type fasteners so that the device can be attached to the wrist of a person.

The Fifth Embodiment

Figure 10:
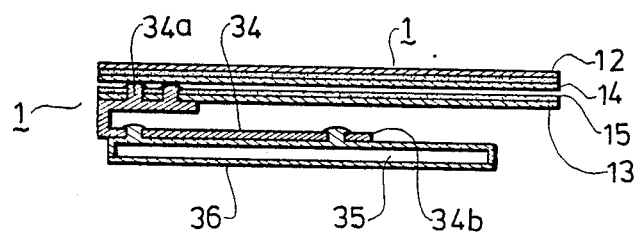
FIGS. 10 and 11 show a fifth embodiment of the attachment device.
Figure 11:
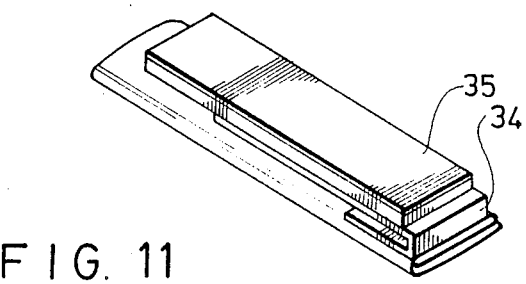
Figure 12:
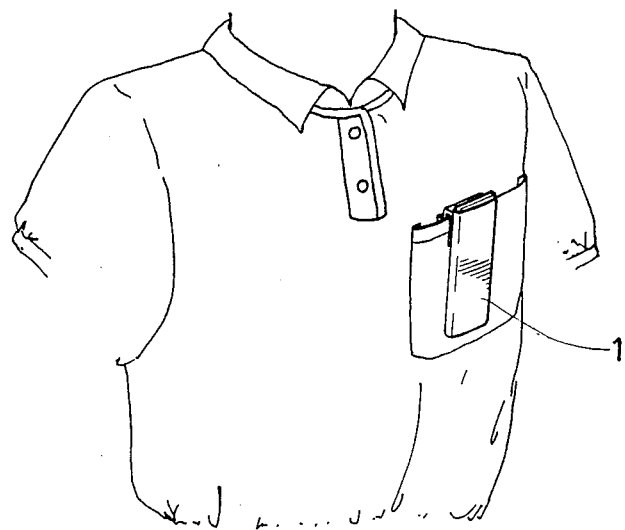
FIG. 12 shows how the attachment device of the fifth embodiment is used.

FIGS. 10 and 11 show a fifth embodiment of the attachment device which differs from the first embodiment in that a flat casing 35 with a cover 36 is connected to the rectangular portion 13 of the plate member 1 by means of a clamp member 34 which is substantially U-shaped. The clamp member 34 has one arm 34a riveted to the folding plate 1 and the other arm 34b riveted to the casing 35. The casing 35 can be used to accommodate an eye-glass demisting agent bottle or the like. The device of this embodiment can be attached to the pocket of the clothing of a person as shown in FIG. 12.

With the invention thus explained, it is apparent that various modifications and variations can be made without departing from the scope of the invention. It is therefore intended the invention be limited only as indicated in the appended claims.

What I claim is:

1. An attachment device comprising:
   (a) a folding plate member having two parallely arranged folding lines therein which divide said folding plate member into three portions, said three portions lying over one another when said folding plate member is folded;
   (b) a first fastener means provided on surfaces of said three portions that contact one another when said folding plate member is folded to adhering face-to-face said three portions to one another, said first fastener means comprising releasable hook-and-loop fastening members;
   (c) two belt members each having a first end placed between said three portions and a second free end opposite to said first end, said first end having a hook-and-loop fastening member to engage with a hook-and-loop fastening member of said folding plate member; and
   (d) a second fastener means connected to said second end of each of said two belt members,
   (e) wherein said first ends of said two belt members are attached to an intermediate one of said three portions.

2. An attachment device as claimed in claim 1, wherein said second fastener means includes a looped tie-cord adapted to be connected to the frame of a pair of eye-glasses.

3. An attachment device as claimed in claim 1, wherein said second fastener means are connectible to one another.

4. An attachment device as claimed in claim 1, wherein said folding plate member is rectangular and elongated when folded.

5. An attachment device as claimed in claim 1, and further comprising a pocket member attached to one of said three portions.

6. An attachment device as claimed in claim 1, and further comprising a watch member attached to one of said three portions.

7. An attachment device as claimed in claim 1, wherein:
   (a) said attachment device further comprises a flat casing and a connecting member to connect said flat casing to said folding plate member;
   (b) said connecting member is in the form of a U-shaped clamp; and
   (c) said flat casing and said folding plate member are substantially parallel.

* * * * *